Sept. 23, 1924.

F. D. TAMPLIN

MEASURING INSTRUMENT

Filed Feb. 24, 1923

1,509,451

WITNESSES

George W. Wright

Inventor
Fred D. Tamplin,
By Richard B. Owen,
Attorney

Patented Sept. 23, 1924.

1,509,451

UNITED STATES PATENT OFFICE.

FRED D. TAMPLIN, OF CHICAGO, ILLINOIS.

MEASURING INSTRUMENT.

Application filed February 24, 1923. Serial No. 620,958.

*To all whom it may concern:*

Be it known that I, FRED D. TAMPLIN, a citizen of the United States, residing at Chicago, in the county of Cook and State of Illinois, have invented certain new and useful Improvements in a Measuring Instrument, of which the following is a specification.

This invention relates to measuring instruments and the primary object of the invention is to provide an inclinometer, which is adapted for carpentry, technical, mechanical, geographical, engineering and similar kinds of work, and which will register accurately the degree of inclination or pitch, when either end thereof is inclined.

A further object of the invention is to provide an inclinometer of this character, which is particularly adapted for measuring aerial angles in aviation and all aircrafts, thereby showing exactly at what angle the aeroplane or other aircraft is flying.

A further object of the invention is to provide an improved instrument which can be used for measuring angles, straight surfaces, curved surfaces and polygonal figures.

A further object of the invention is to to provide an improved instrument embodying a pendulum pointer finely balanced, which is adapted to swing around a scale showing the various degrees of a circle, the instrument also embodying spirit-levels for cooperation with the pendulum pointer.

A further object of the invention is to provide a spirit level and inclinometer embodying a straight edge, thereby permitting the instrument to be used on all kinds of work.

A further and prime object of the invention is to provide an instrument for measuring the elevation of any object in feet and degree by the use of a gravity operated pendulum pointer.

A further object of the invention is to provide an inclinometer embodying a scale divided into degrees of a circle and a pivoted pointer, the pointer having associated therewith a relatively small compass, which acts as a weight for the pointer and also means for showing the various directions.

A still further object of the invention is to provide an improved instrument of the above character, which will be durable and efficient in use, one which will be simple and easy to manufacture, and one which can be placed upon the market at a reasonable cost.

With these and other objects in view the invention consists in the novel construction, arrangement and formation of parts, as will be hereinafter more specifically described, claimed and illustrated in the accompanying drawings, in which drawings:

Figure 1:
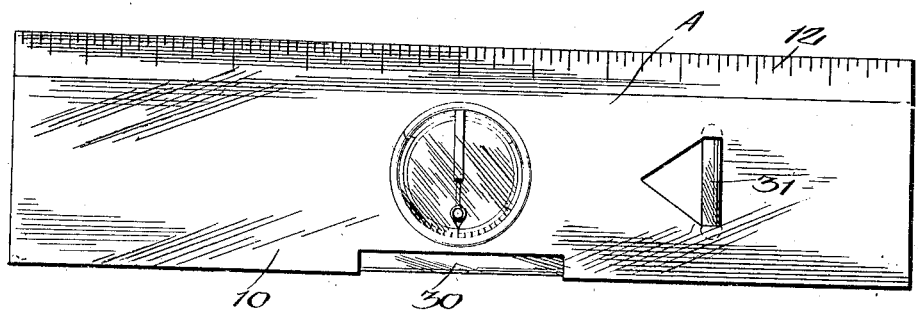
Figure 1 is an elevation of one form of the improved instrument.
Figure 2:
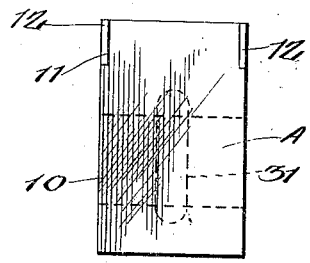
Figure 2 is an end elevation of the same.
Figure 3:
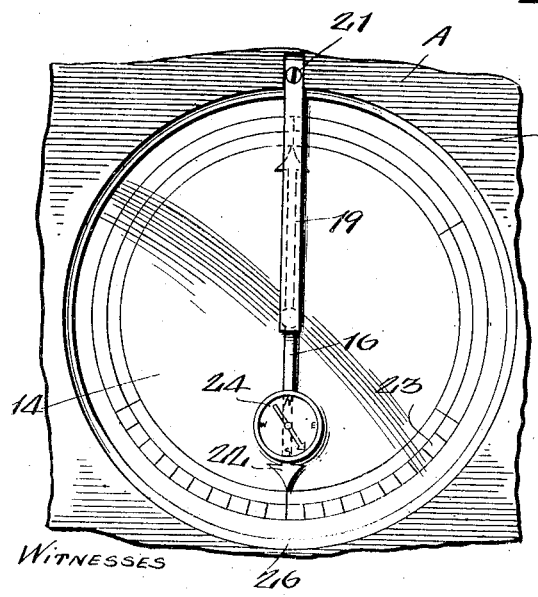
Figure 3 is an enlarged fragmentary front elevation of the instrument showing the novel inclinometer, the cover thereof being removed.
Figure 4:
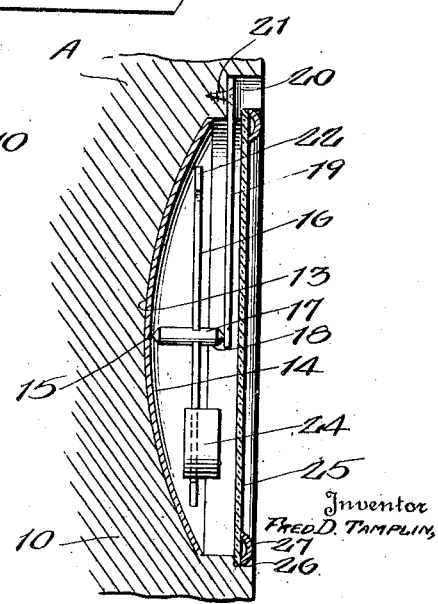
Figure 4 is an enlarged transverse section through the instrument illustrating the improved inclinometer.

Referring to the drawings in detail, wherein similar reference characters designate corresponding parts throughout the several views the letter A generally indicates the improved instrument, which in this form embodies a stock 10, which can be formed of any desired material, such as wood, metal, fiber, glass or the like. This stock embodies upper and lower flat plane surfaces and flat side faces and plane or flat end faces. The stock can be of any desired length, and the stock illustrated in Figure 1 of the drawings is to be of a one-foot length and the opposite faces thereof at the upper edge of the stock are rabbeted as at 11 for the reception of straight-edge rulers 12, which are graduated the same as ordinary rulers as clearly shown in Figure 1 of the drawings.

One face of the stock 10 at the central portion thereof is provided with an inwardly extending concave depression 13 in which is fitted a concavo-convex shaped plate 14 having the axial center thereof provided with a socket 15 which forms a bearing, the purpose of which will be hereinafter more fully described. Disposed in the recess 13 is a double ended pointer 16 having a balance shaft 17 at its transverse center. The opposite terminals of this balance shaft 17 are pointed as at 18 and one end of the same is adapted to be placed in the socket 15, while the other end thereof can be placed in a suitable socket formed in a bridge strap 19. The pointed terminals 18 of the balance shaft 17 can rest on jewel bearings placed in the sockets of the concavo-convex shaped plate 14 and the bridge strap 19 if so desired.

The bridge strap 19 can extend entirely across the plate 14 or can extend inwardly from any point thereof. As shown the bridge strap 19 extends downwardly from the upper edge of the recess and is fitted in a notch 20 in the stock. A screw 21 is employed for holding the bridge strap 19 in place.

It is obvious that by this construction the pointer 16 is freely mounted for swinging or rotary movement. As stated the pointer 16 is double-ended and each end thereof is provided with an arrow-shaped head 22. The plate 14 at the periphery thereof can be graduated into the different degrees of a circle as indicated by the reference character 23 and it is preferred to have the different marks on the scale numbered to facilitate the reading thereof. The scale 23 can be placed on independent members if so desired instead of being marked on the plate 14.

In order to hold the pointer 16 in a perpendicular position at all times irrespective of in what angle the stock 10 is held or placed in order to show the angle of the inclination of the stock, a weight 24 is provided. This weight 24 is in the form of a compass and thus it can be seen that the same has dual function first to form a compass and second to form a weight for the pointer 16.

A suitable cover can be provided for the pointer 16 and the concavo-convex shaped plate 14. As shown a glass panel 25 is placed in a rabbeted portion 26 of the stock formed around the recess 13. A retaining ring 27 is utilized for holding the glass panel 25 in place. Suitable spirit levels 30 and 31 are placed at right angles to each other and are disposed within the stock 10, in the ordinary manner as is common in spirit levels and plumbs and thus the instrument can be used as an ordinary spirit level or plumb. These spirit levels will also prove when the zero mark on the scale 23 is in a correct position on the stock.

While I have shown the various features of the instrument incorporated in a straight stock 10, it is to be understood that the various features can be incorporated in different shaped bodies such as triangles or the like.

As stated, one of the important and prime objects of the invention is to provide an instrument for determining the elevation of an object of known length when the same is at an angle to the horizontal and in Figures 5 and 6 are shown tables for cooperating with the pointer 16 and scale 23 for giving the different elevations.

From the foregoing description it can be seen that an improved instrument has been provided of exceptionally simple and durable character, which will effectively accomplish the purpose intended.

Changes in details may be made without departing from the spirit or scope of this invention.

What I claim as new is:—

1. A measuring instrument comprising a body, an inclinometer including a dial plate and a rotatable weighted pointer associated with said body, a spirit level and plumb carried by the body and a graduated rule secured to one edge of said body.

2. A measuring instrument including a body, an inclinometer associated with the body including a graduated plate for indicating different degrees of a circle, a rotatable pointer for movement around the plate, means for supporting the pointer, and a compass carried by the lower end of the pointer for acting as a weight therefor.

3. In a measuring instrument of the character described, a body having a concavo-convex recess in one place thereof and a rabbet around said recess defining a shoulder, a concavo-convex shaped plate disposed in the recess, a radially extending bridge arm secured to the body and terminating adjacent to the axial center of the plate, a balance shaft having the terminals thereof pointed and mounted in the plate and the bridge arm, a double ended pointer secured to the balance shaft, a weight on said pointer, a transparent cover plate disposed in the rabbet and fitted against said shoulder, and a retaining ring for holding the transparent plate in position.

In testimony whereof I affix my signature in presence of two witnesses.

FRED D. TAMPLIN.

Witnesses:
  HENRY PAJEAN,
  ANTHONY MANKAS.